(12) United States Patent
Yoon

(10) Patent No.: US 6,934,282 B1
(45) Date of Patent: Aug. 23, 2005

(54) GATEWAY SYSTEM FOR VOICE COMMUNICATION AND CONTROLLING METHOD THEREOF

(75) Inventor: In Ho Yoon, Seoul (KR)

(73) Assignee: LG Electronics Inc., Seoul (KR)

(*) Notice: Subject to any disclaimer, the term of this patent is extended or adjusted under 35 U.S.C. 154(b) by 985 days.

(21) Appl. No.: 09/641,677

(22) Filed: Aug. 18, 2000

(30) Foreign Application Priority Data

Aug. 20, 1999 (KR) ................................. 1999-34626

(51) Int. Cl.[7] ............................................. H04L 12/66
(52) U.S. Cl. ....................... 370/356; 370/401; 370/477
(58) Field of Search ................................ 370/252, 260, 370/261, 352, 353, 357, 356, 400, 401, 389, 370/465, 468, 477

(56) References Cited

U.S. PATENT DOCUMENTS

| | | | |
|---|---|---|---|
| 6,226,287 B1 * | 5/2001 | Brady | 370/352 |
| 6,373,857 B1 * | 4/2002 | Ma | 370/475 |
| 6,404,746 B1 * | 6/2002 | Cave et al. | 370/262 |
| 6,487,196 B1 * | 11/2002 | Verthein et al. | 370/352 |

* cited by examiner

Primary Examiner—Chi Pham
Assistant Examiner—Derrick W. Ferris
(74) Attorney, Agent, or Firm—Birch, Stewart, Kolasch & Birch, LLP

(57) ABSTRACT

A gateway system for voice communication and its controlling method are provided in which a voice signal transmitted from terminals is compressed to be transmitted to the Internet and the compressed voice signal transmitted from the Internet is uncompressed to be transmitted to the terminals, thereby enabling voice communication between terminals. The gateway system is provided for voice communication of a communication system for performing communication among PSTN terminals connected to a PSTN, IP terminals connected to an Internet protocol-based local area network (LAN) and remote terminals of a different area connected to the Internet. The gateway system includes a PSTN gateway for rendering the PSTN terminals and the IP terminals to communicate with each other; and an inter-gateway for rendering the IP terminals and the PSTN terminals through the PSTN gateway to communicate with the remote terminals through the Internet.

12 Claims, 5 Drawing Sheets

GATEWAY SYSTEM FOR VOICE COMMUNICATION AND CONTROLLING METHOD THEREOF

BACKGROUND OF THE INVENTION

1. Field of the Invention

The present invention relates to a gateway system for a voice communication between terminals connected with the Internet, and more particularly, to a gateway system for voice communication in which a voice signal transmitted from terminals are compressed to be transmitted to the Internet and the compressed voice signal transmitted from the Internet is uncompressed to be transmitted to the terminals, thereby enabling voice communication between terminals. The invention also relates to a controlling method of the gateway system.

2. Description of the Background Art

Generally, there are two communication methods: a voice communication method applied between terminals (i.e., telephone or facsimile, etc.) connected with a public switch telephone network (PSTN) and a data communication method applied between terminals (i.e., Internet phone, personal computer, etc.) connected with a local area network (LAN) that is connected with the PSTN or with a dedicated network.

Recently, as communication equipment and techniques are being progressed, the voice communication and the data communication are made through a single communication network. That is, an Internet phone and a PC are respectively connected with the LAN connected with Internet protocol-based Internet, so that voice communication is made through the internet phone while data communication is made through the PC.

Generally, communication protocols such as a ring signal period and a communication system between exchanges are differently set according to regions or nations. But, in case of the Internet phone connected with the Internet on the basis of the Internet protocol (TCP/IP), since voice communication is performed through the Internet, without requiring the PSTN for use only for voice communication, regardless of a private branch exchange (PBX) pursuant to the communication protocols, no expense incurs with respect to maintaining and managing the PSTN.

In a situation with the network formed as described above, in order to perform voice communication through the Internet on a real time basis, the voice signal is to be compressed and packetized to a small size and then transmitted to the Internet, and the compressed voice signal as received from the Internet is to be restored to its original voice signal. In this respect, a CODEC for performing a function to compress the voice signal and restore the compressed voice signal to its original signal must be installed at the Internet phone.

The communication protocols for the voice communication through the Internet includes recommendation H.323 incorporated by ITU-T (International Telecommunication Union-Telecommunication Standardization Sector), and the recommendation H.323 uses recommendation Q.931 for connection establishment. Developed for ISDN (Integrated Services Digital Network), the recommendation Q.931 processes the voice signal as well as a call in the Internet phone itself.

A recently developed multimedia Internet protocol system (MIPS) to support the recommendations H.323 and Q.931 of the protocols and enable communications through the Internet includes a gateway system enabling communication between Internet phones by transmitting a voice signal packet through the Internet.

However, when the Internet phone connected with the gateway system of the conventional art constructed as described above is desired to communicate with other Internet phone, a voice signal should be compressed and packetized by a CODEC installed in the Internet phone itself to be transmitted, and the compressed voice signal should be received and restored to its original voice signal.

Therefore, the gateway system in accordance with the conventional art is disadvantageous in that since the voice signal is processed by the CODEC installed in the Internet phone no matter that the Internet phone communicates with an Internet phone or a telephone set located in a remote place through the Internet or that the Internet phone communicates with other Internet phone commonly connected with a single LAN, the voice communication between the Internet phones is not performed on a real time basis. Moreover, only the Internet phone including the CODEC can perform voice communication.

SUMMARY OF THE INVENTION

Therefore, an object of the present invention is to provide a gateway system for voice communication for rendering IP terminals connected to a local area network (LAN) to communicate with each other, rendering PSTN terminals connected to a PSTN to communicate with each other, rendering the IP terminals and the PSTN terminals to communicate with each other, rendering the IP terminals and the PSTN terminals to voice-communicate with PSTN terminals and IP terminals of a different area with each other through the Internet, and its controlling method.

Another object of the present invention is to provide a gateway system for voice communication for rendering IP terminals that support the Internet protocols and do not require a CODEC to voice-communicate with different IP terminals or with PSTN terminals, and to provide a controlling method for the gateway system.

To achieve these and other advantages and in accordance with the purpose of the present invention, as embodied and broadly described herein, there is provided a gateway system for voice communication of a communication system for performing communication among PSTN terminals connected to a PSTN, IP terminals connected to an Internet protocol-based local area network (LAN) and remote terminals of a different area connected to the Internet, the gateway system including: a PSTN gateway for rendering the PSTN terminals and the IP terminals to communicate with each other; and an inter-gateway for rendering the IP terminals and the PSTN terminals through the PSTN gateway to communicate with the remote terminals through the Internet.

In order to achieve the above and other objects, there is also provided a gateway system for voice communication including: a PSTN terminal connected to a PSTN for communication; an IP terminal connected to a local area network (LAN) for communication; a PSTN gateway for rendering the PSTN terminal and the IP terminal to communicate with each other; and an inter-gateway for rendering the IP terminal and the PSTN gateway to which the PSTN terminal is connected, to communicate with an IP terminal and a PSTN terminal of a different area through the Internet.

In order to achieve the above and other objects, there is also provided a method for controlling a gateway system for voice communication including the steps of: connecting a first terminal connected with an Internet protocol-based LAN with a first inter-gateway that converts a protocol of the first terminal and connects it with the Internet; connecting the first inter-gateway and a second inter-gateway as the first terminal is connected with the first inter-gateway and transmits an ID of the second gateway connected with the Internet; transmitting an Internet phone number of a second terminal connected with the second inter-gateway by the first terminal as the first terminal and the first and the second inter-gateways are connected with each other, and receiving a call signal from the second terminal; and performing voice communication between the first and the second terminals.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
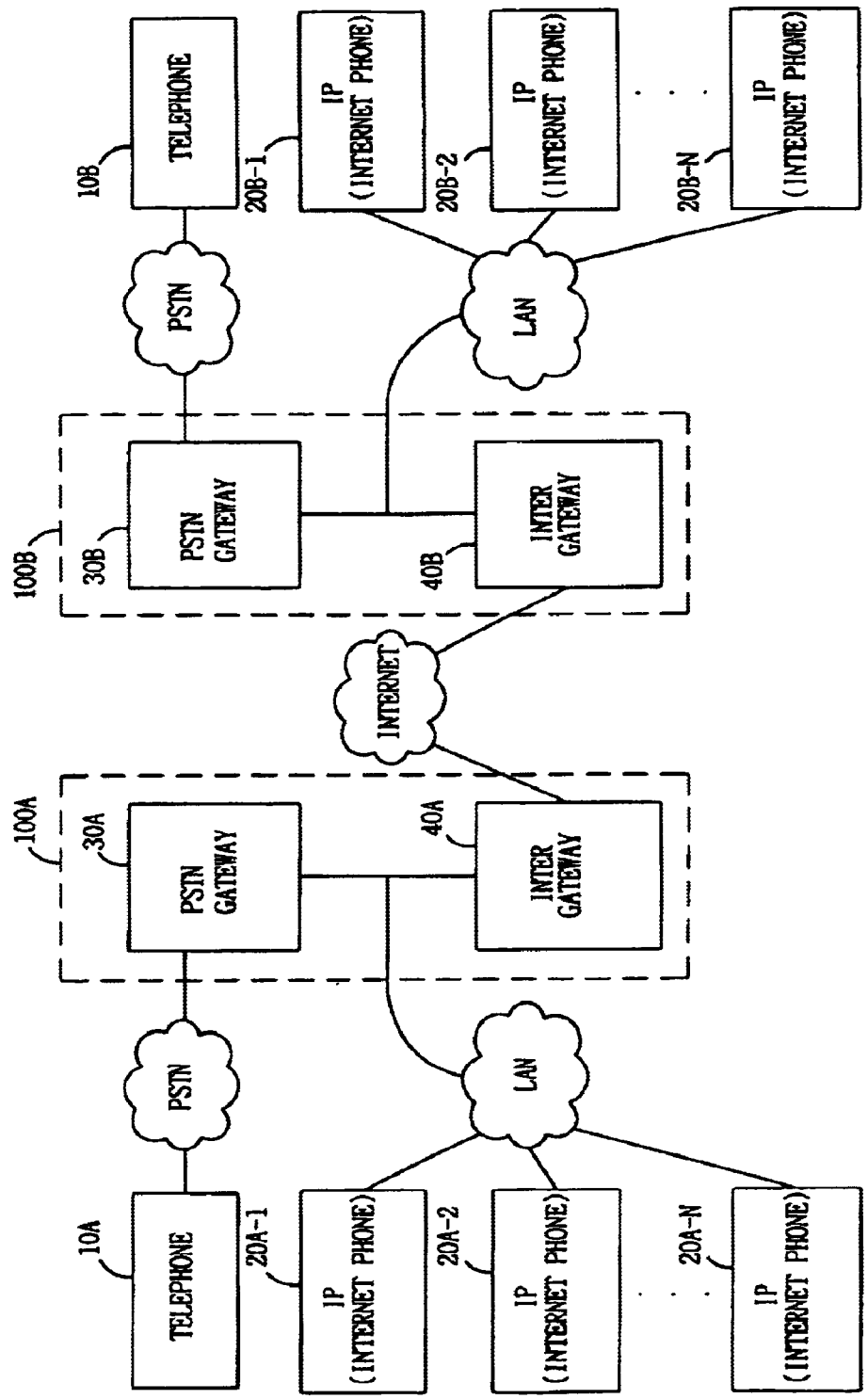
FIG. 1 is a schematic view showing a construction of a gateway system for voice communication in accordance with the present invention.

FIG. 1 is a view showing a construction of a communication system adopting a gateway system for voice communication in accordance with the present invention.

As shown in the drawing, a communication system of an area 'A' includes a gateway system '100A' for connecting the PSTN and a local area network (LAN) with the Internet, a telephone set '10A' connected with the PSTN and Internet phones '20A-1, 20A-2, . . . ,20A-N', and, likewise, a communication system of an area 'B' includes a gateway system '100B' for connecting the PSTN and the LAN with the Internet, a telephone set '10B' connected with the PSTN, and Internet phones '20B-1, 20B-2, . . . , 20B-N'.

The gateway system 100A of the area 'A' includes a PSTN gateway 30A for converting a protocol of a signal transmitted to or received from a telephone set 10A connected with the PSTN to render the Internet phones 20A-1, 20A-2, . . . , 20A-N connected with the telephone 10A and the LAN to communicate with each other; and an inter-gateway 40A for compressing a signal processed by the PSTN gateway 30A and signals received from the Internet phones 20A-1, 20A-2, . . . , 20A-N to transmit them to terminals (i.e., 10B, 20B-1, 20B-2, . . . , 20B-N) connected with the Internet, uncompressing a signal transmitted from the Internet to transmit it to the terminals 20A, 20A-1, 20A-2, . . . 20A-N, to thereby perform communication between the terminals 10A, 20A-1, 20A-2, . . . , 20A-N, 10B, 20B-1, 20B-2, . . . , 20B-N.

The gateway system 100B of the area 'B' is symmetrically constructed with the gateway system 100A of the area 'A'.

In the communication system adopting the gateway system constructed as described above in accordance with an embodiment of the present invention, a voice signal packet is transmitted and received between the Internet phones 20A-1, 20A-2, . . . , 20A-N and the Inter-gateway 40A, while a compressed voice signal packet is transmitted and received between the inter-gateway 40A and the inter-gateway 40B of the other area through the Internet.

That is, according to the gateway system of the present invention, voice communication between the Internet phones connected with the LAN is performed by a voice signal that is not compressed, and only when the voice communication is made through the Internet, the voice signal transmitted from the Internet phone is compressed and transmitted to the Internet and the compressed voice signal is received from the Internet and uncompressed to be transmitted to the Internet phone by using the Inter-gateway, so that the voice communication between the Internet phones can be effectively performed.

Figure 2:
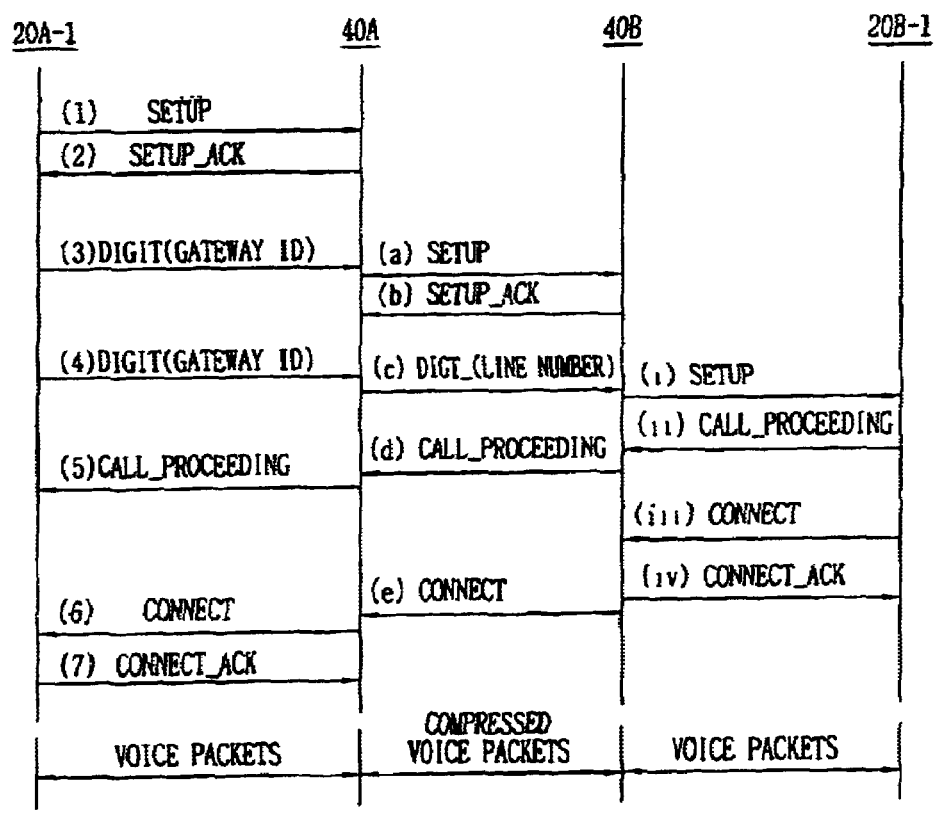
FIG. 2 is a view showing a process of transmitting and receiving signals between Internet phones connected with the Internet for voice communication in accordance with the present invention.

FIG. 2 is a view showing a process of transmitting and receiving signals between Internet phones connected with the Internet for voice communication in accordance with the present invention.

With reference to FIG. 2, first, when the Internet phone 20A-1 transmits a connection request message (SETUP) to the inter-gateway 40A-1 through the LAN (1), the inter-gateway 40A allocates one of standby (idle) channels among a plurality of CODEC channels thereof and transmits a connection request response message (SETUP_ACK) to the Internet phone 20A-1 (2).

At this time, in case that the CODEC channels are all in an active state, the inter-gateway 40A transmits a connection request rejection message (SETUP_REJ) to the Internet phone 20A-1.

Upon receipt of the connection request response message (SETUP_ACK), the Internet phone 20A-1 transmits an ID of the inter-gateway 40B and the number of the Internet phone 20B-1 with which the Internet phone 20A-1 is intended to be connected to the inter-gateway 40A (3)(4).

After receiving the ID of the inter-gateway 40B, when the inter-gateway 40A converts the ID of the inter-gateway 40B to an Internet protocol address (IP address) by using a pre-set mapping table and transmits a connection request message (SETUP) to the inter-gateway 40B corresponding to the IP address (a), the inter-gate way 40B allocates an idle one of a plurality of CODEC channels thereof and transmits a connection request response message (SETUP_ACK) to the inter-gateway 40A (b).

Upon receipt of the connection request response message (SETUP_ACK), the inter-gateway 40A transmits the number of the Internet phone 20B-1 with which the Internet phone 20A-1 is intended to be connected to the inter-gateway 40B (c). Then, the inter-gateway 40B transmits a connection request message (SETUP) to the Internet phone 20B-1 corresponding to that number (i).

Upon receipt of the connection request message from the inter gateway 40B, when the Internet phone 20B-1 rings and a user picks up the receiver thereof, a connection proceeding message (CALL_PROCEEDING) is outputted to the inter-gateway 40B (ii). The inter-gateways 40B and 40A that are sequentially receiving the connection proceeding message transmit the connection proceeding message to the Internet phone 20A-1 (d)(5).

And then, after a predetermined time elapses, when the Internet phone 20B-1 transmits a connection completion message (CONNECT) to the inter-gateway 40B (iii), the inter-gateway 40B transmits a connection completion response message (CONNECT_ACK) to the Internet phone 20B-1 (iv) and transmits a connection completion message (CONNECT) to the inter-gateway 40A (e).

When the inter-gateway 40A transmits a connection completion message (CONNECT) to the Internet phone 20A-1 (6), the Internet phone 20A-1 transmits a connection completion response message (CONNECT_ACK) to the inter-gateway 40A (7).

Accordingly, the voice channels of the Internet phones 20A-1 and 20B-1 and the inter-gateways 40A and 40B become active, by which the voice communication is made between the Internet phones.

In this respect, since the Internet phones 20A-1 and 20B-1 do not include a CODEC, the voice is simply packetized and then transmitted to the inter-gateways 40A and 40B. Then, the inter-gateways compress the voice signal and transmit and receive the voice signal each other through an allocated CODEC channel, and then uncompress the compressed voice signal as received and transmit it to the Internet phones, thereby making voice communication between the Internet phones.

Figure 3A:
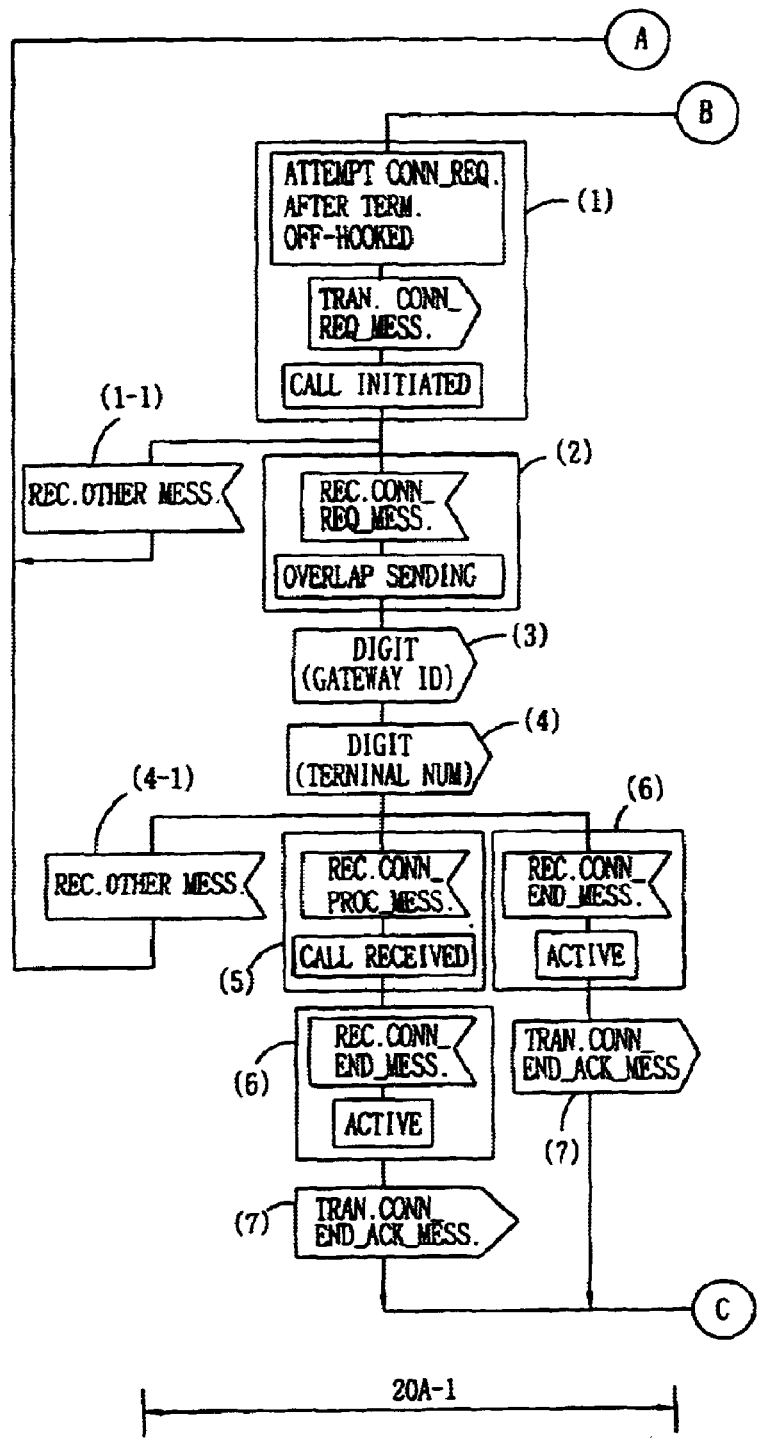
FIG. 3 is a detailed view showing the process of transmitting and receiving of signals between Internet phones connected with the Internet for voice communication in accordance with the present invention of FIG. 2 in accordance with the present invention.
Figure 3B:
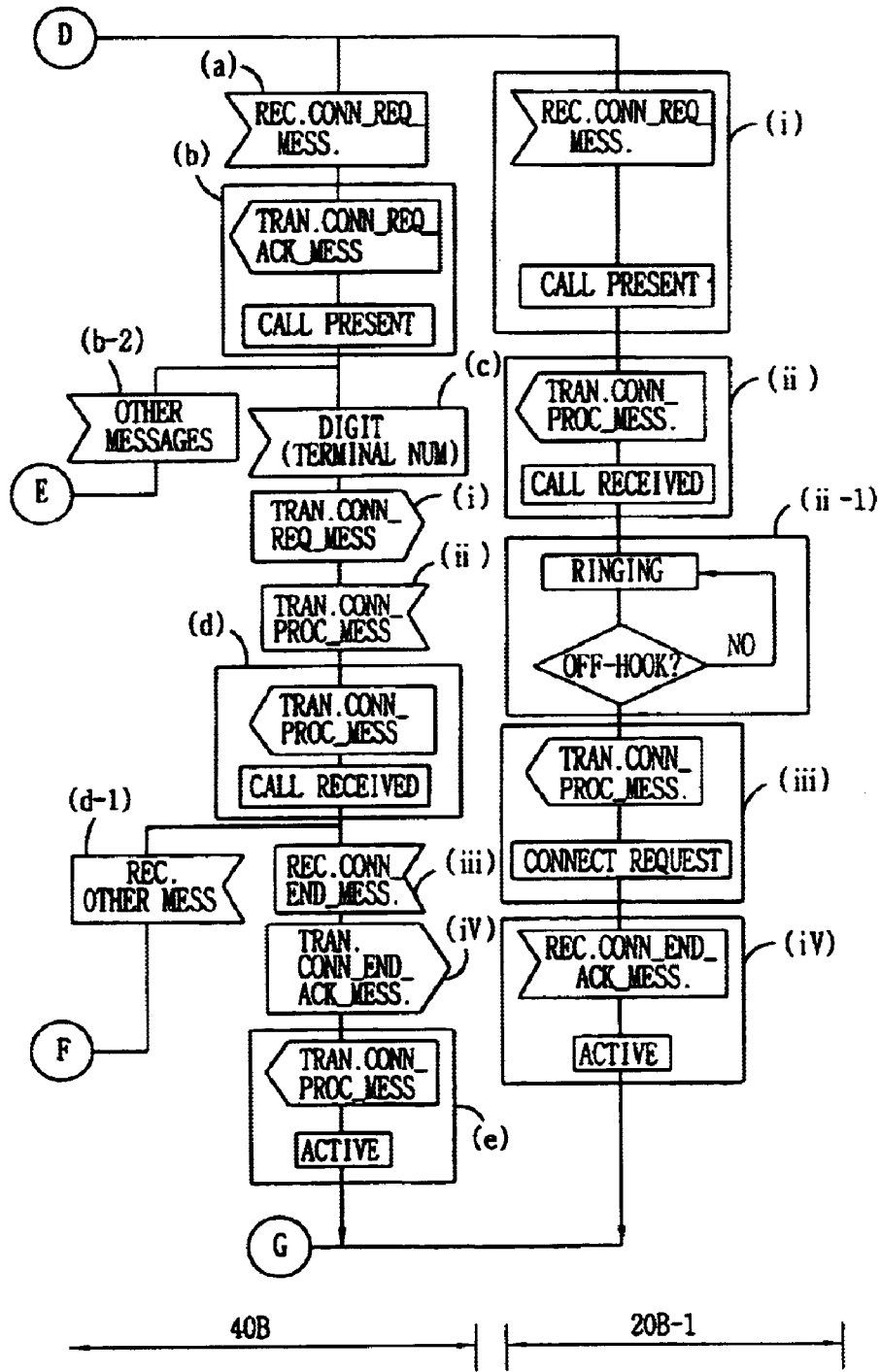
Figure 3C:
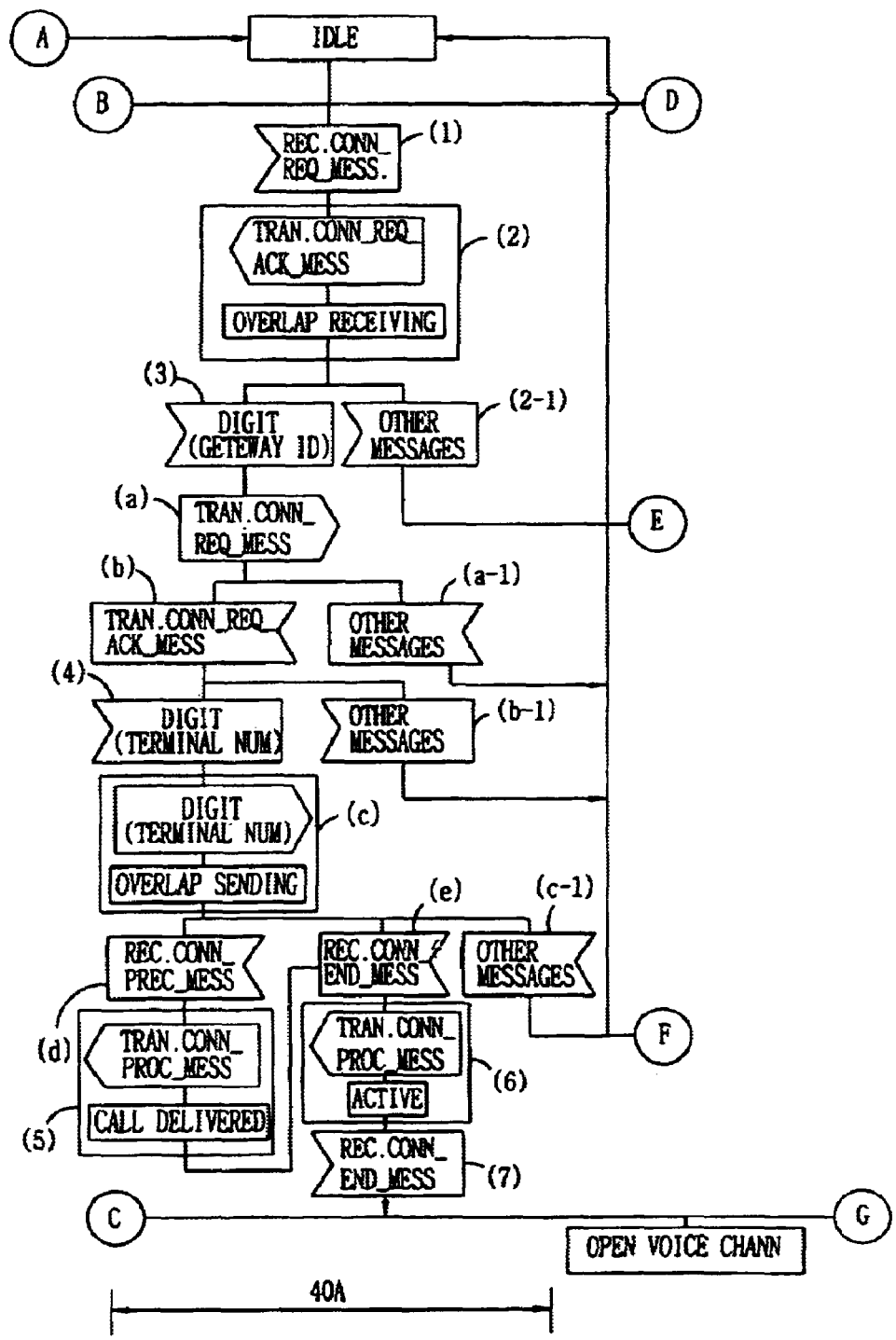

FIG. 3 is a detailed view showing the process shown in FIG. 2 of transmitting and receiving signals between Internet phones connected with the Internet for voice communication in accordance with the present invention First, in order to connect the Internet phone 20A-1 with the intended Internet phone 20B-1, when the Internet phone is off the hook, a connection request message (SETUP) is transmitted to the inter-gateway 40A and a call signal is initiated (1).

Upon receipt of the connection request message (SETUP), the inter-gateway 40A transmits a connection request response message (SETUP_ACK) to the Internet phone 20A-1 and then is changed to an overlap received state. The Internet phone 20A-1 receiving the connection request response message (SETUP_ACK) is changed to an overlap sending state (2).

While the Internet phone 20A-1 and the inter-gateway 40A are in the overlap sensing state and in the overlap received state, when the Internet phone 20A-1 transmits an ID of the inter-gateway 40B to the inter-gateway 40A, the inter-gateway 40A receives the ID of the inter-gateway 40B (3) and then transmits a connection request message (SETUP) to the inter-gateway 40B (a).

After receiving the connection request message from the inter-gateway 40A (a), the inter-gateway 40B transmits the connection request response message to the inter-gateway 40A and is changed to a call present state.

After a predetermined time elapses, when the Internet phone 20A-1 transmits the number of the Internet phone 20B-1 with which itself intends to be connected with the inter-gateway 40A, the inter-gateway 40A transmits the number of the Internet phone 20B-1 with which the Internet phone 20A-1 intends to be connected, to the inter-gateway 40B (c).

Then, the inter-gateway 40B transmits a connection request message (SETUP) to the Internet phone 20B-1 corresponding to that number (i). When the Internet phone 20B-1 receives the connection request message from the inter-gateway 40B, it is changed to the call present state (i), transmits the connection proceeding message to the inter-gateway 40B and then is changed to the call signal received state (ii). At the same time, the Internet phone 20B-1 rings (ii-1).

Upon receipt of the connection proceeding message (ii), the inter-gateway 40B transmits the connection proceeding message to the inter-gateway 40A and is changed to a call signal received state (d).

Upon receipt of the connection proceeding message, the inter-gateway 40A transmits the connection proceeding message to the Internet phone 20A-1 and is changed to a call signal transmitting state (5).

Upon receipt of the connection proceeding message, the Internet phone 20A-1 is changed to a call signal received state (5).

Meanwhile, when the Internet phone 20B-1 is off the hook, the connection completion response message is transmitted to the inter-gateway 40B and is changed to the connection request state (iii).

After receiving the connection completion message, the inter-gateway 40B-1 transmits the connection completion response message to the Internet phone 20B-1, so that the Internet phone 20B-1 activates the voice channel, and transmits the connection completion message to the inter-gateway 40A so that the Inter-gateway 40A becomes active (e).

Upon receipt of the connection completion message, the inter-gateway 40A transmits the connection completion message to the Internet phone 20A-1 and is changed to an active state (6). Upon receipt of the connection completion message, the Internet phone 20A-1 transmits the connection completion response message to the inter-gateway 40A, so that the voice channel becomes active (7).

Accordingly, the voice channel of the Internet phones 20A-1 and 20B-1 and the inter-gateways 40A and 40B becomes active, and voice communication is made between the Internet phones.

In this respect, in case that the Internet phones 20A-1 and 20B-1 and the gateways 40A and 40B receive a different message other than the corresponding message (1-1, 2-1, 4-1, a-1, b-1, c-1 and d-1), they are changed to a standby state.

In the above described embodiment of the gateway system of the present invention, voice communication between the Internet phones are taken as example, but proceedings that a telephone set connected with the PSTN communicates with a different terminal are performed in the same manner.

As so far described, according to the gateway system for voice communication and its controlling method of the present invention, the voice signal transmitted from the terminals is compressed and transmitted to the Internet and the compressed voice signal as transmitted from the Internet is uncompressed and transmitted to the terminals, by which the terminals connected with the Internet simply perform voice communication without a CODEC in the terminals.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A gateway system for voice communication of a communication system for performing communication among PSTN terminals connected to a PSTN, IP terminals connected to an Internet protocol-based local area network (LAN) and remote terminals of a different area connected via the Internet, the gateway system comprising:

a PSTN gateway connected to the PSTN and the LAN for rendering the PSTN terminals connected to the PSTN and the IP terminals connected to the LAN to communicate with each other; and an inter-gateway receiving voice packets transmitted from the PSTN gateway and from the IP terminals, and generating and transmitting compressed voice packets to the Internet, the inter-gateway receiving compressed voice packets from the Internet and uncompressing the received compressed voice packets for rendering the IP terminals and the PSTN terminals connected to the PSTN gateway to communicate with the remote terminals through the Internet, wherein voice packets from the IP terminals connected with the LAN are transmitted to the remote terminals through the inter-gateway after being compressed, voice signals from the PSTN terminals connected with the PSTN are packetized by the PSTN gateway and transmitted to the remote terminals through the inter-gateway after being compressed, and the PSTN terminals and the IP terminals communicate with each other by uncompressed voice packets through the PSTN gateway.

2. The gateway system according to claim 1, wherein the remote terminals are remote PSTN terminals connected to another PSTN connected to a remote inter-gateway and remote IP terminals connected to another LAN connected to the remote inter-gateway.

3. The gateway system according to claim 2, wherein the inter-gateway and the remote inter-gateway communicate with each other by compressed voice signal packets.

4. The gateway system according to claim 1, wherein the inter-gateway compresses each signal received from the PSTN and IP terminals to transmit the compressed signals to a remote inter-gateway via the Internet, and receives the compressed signals from the remote inter-gateway, uncompresses them to restore original signals and transmits the restored signals to corresponding terminals.

5. The gateway system according to claim 1, wherein the packetized voice signals from the PSTN are compressed by the inter-gateway into compressed voice packets, which are then transmitted to the remote terminals over the Internet.

6. The gateway system according to claim 1, wherein the PSTN terminals and the IP terminals communicate the uncompressed voice packets with each other through the PSTN gateway without using the inter-gateway.

7. A gateway system for voice communication, the gateway system comprising:

at least one PSTN terminal connected to a PSTN for communication;

at least one IP terminal connected to a local area network (LAN) for communication;

a PSTN gateway connected to the PSTN and the LAN for rendering the at least one PSTN terminal connected to the PSTN and the at least one IP terminal connected to the LAN to communicate with each other; and an inter-gateway having CODECs, receiving voice packets transmitted from the PSTN gateway and from the at least one IP terminal to generate compressed voice packets and transmitting the generated compressed voice packets to the Internet, and receiving compressed voice packets from the Internet and uncompressing the received packets for rendering the at least one IP terminal and PSTN gateway to which the at least one PSTN terminal is connected, to communicate with remote terminals of a different area through the Internet, and wherein voice packets from the at least one IP terminal are transmitted to one or more of the remote terminals through the inter-gateway after being compressed, voice signals from the at lest one PSTN terminal are packetized by the PSTN gateway and transmitted to one or more of the remote terminals through the inter-gateway after being compressed, and the at least one PSTN terminal and the at least one IP terminal communicate with each other by uncompressed voice packets through the PSTN gateway.

8. The gateway system according to claim 7, wherein the inter-gateway communicates with the PSTN gateway or with the at least one IP terminal by uncompressed voice packets.

9. The gateway system according to claim 7, wherein the signals transmitted and received between the PSTN terminal and the at least one IP terminal are uncompressed voice signal packets.

10. The gateway system according to claim 7, wherein the remote terminals are remote PSTN terminals connected to another PSTN connected to a remote inter-gateway and remote IP terminals connected to another LAN connected to the remote inter-gateway.

11. The gateway system according to claim 10, wherein communication between the inter-gateways are made in a manner that a compressed packet signal is transmitted through the Internet and the compressed packet signal as received is uncompressed to be restored to its original signal.

12. The gateway system according to claim 7, wherein the at least one PSTN terminal and the at least one IP terminal communicate the uncompressed voice packets with each other through the PSTN gateway without using the inter-gateway.

* * * * *